(12) United States Patent
Hamada et al.

(10) Patent No.: US 9,272,445 B2
(45) Date of Patent: Mar. 1, 2016

(54) RUBBER VULCANIZER AND RUBBER VULCANIZING METHOD

(71) Applicant: JTEKT Corporation, Osaka-shi (JP)

(72) Inventors: Kazuki Hamada, Kashiwara (JP); Isao Usuki, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/330,345

(22) Filed: Jul. 14, 2014

(65) Prior Publication Data

US 2015/0021828 A1 Jan. 22, 2015

(30) Foreign Application Priority Data

Jul. 18, 2013 (JP) ................. 2013-149503

(51) Int. Cl.

| | |
|---|---|
| B29C 35/02 | (2006.01) |
| B29K 7/00 | (2006.01) |
| B29C 33/00 | (2006.01) |
| B29C 33/02 | (2006.01) |
| B29K 21/00 | (2006.01) |
| B29D 99/00 | (2010.01) |

(52) U.S. Cl.
CPC ............. *B29C 35/02* (2013.01); *B29C 33/0088* (2013.01); *B29C 33/0022* (2013.01); *B29C 33/02* (2013.01); *B29D 99/0032* (2013.01); *B29K 2007/00* (2013.01); *B29K 2021/00* (2013.01)

(58) Field of Classification Search
CPC B29C 33/0022; B29C 33/0088; B29C 33/02; B29C 35/02; B29D 99/0032
See application file for complete search history.

(56) References Cited

U.S. PATENT DOCUMENTS

| | | | | |
|---|---|---|---|---|
| 1,677,200 | A * | 7/1928 | Oakley | 425/339 |
| 2,883,705 | A * | 4/1959 | Hartley | 425/339 |
| 4,146,600 | A * | 3/1979 | Elly et al. | 264/39 |
| 4,370,112 | A * | 1/1983 | Sorbier | 425/3 |
| 4,456,448 | A * | 6/1984 | Pippert | 425/234 |
| 2006/0078634 | A1 | 4/2006 | Marc | |
| 2013/0017287 | A1 | 1/2013 | Shintani | |
| 2013/0175328 | A1 | 7/2013 | Trask | |
| 2013/0175329 | A1 | 7/2013 | Trask | |

FOREIGN PATENT DOCUMENTS

JP 63-88416 U 6/1988

OTHER PUBLICATIONS

Extended European Search Report issued Dec. 10, 2014 in Patent Application No. 14177251.7.

* cited by examiner

*Primary Examiner* — Jill Heitbrink

(74) *Attorney, Agent, or Firm* — Oblon, McClelland, Maier & Neustadt, L.L.P.

(57) ABSTRACT

A rubber vulcanizer includes: a pair of heat plates disposed to be opposed to each other in a prescribed direction and to be apart from each other in the prescribed direction; and one or more dies for rubber molding stacked on each other in the prescribed direction between the heat plates. The rubber vulcanizer is able to realize either a state in which the dies of which the number is N are stacked on each other in the prescribed direction between the heat plates, or a state in which the dies of which the number is (N+1) are stacked on each other in the prescribed direction between the heat plates, where N is a natural number that satisfies at least a condition that $1 \leq N \leq M$, and M is a certain positive integer.

3 Claims, 5 Drawing Sheets

RUBBER VULCANIZER AND RUBBER VULCANIZING METHOD

INCORPORATION BY REFERENCE

The disclosure of Japanese Patent Application No. 2013-149503 filed on Jul. 18, 20013 including the specification, drawings and abstract is incorporated herein by reference in its entirety.

BACKGROUND OF THE INVENTION

1. Field of the Invention

The invention relates to a rubber vulcanizer and a rubber vulcanizing method. The invention is applicable to manufacturing of any products made of rubber that is vulcanized in dies. The invention is suitably applicable to manufacturing of, for example, an annular or strip-shaped rubber product used for a damper pulley that is fitted on a crankshaft to turn a belt for driving an engine auxiliary machine.

2. Description of the Related Art

Japanese Utility Model Application Publication No. 63-88416 describes an example of a conventional rubber vulcanizer (FIG. 1). The vulcanizer includes an upper die and a lower die. Each of the upper die and the lower die has two recesses. The recesses of the upper die and the recesses of the lower die define rubber molding cavities in cooperation with each other. Because two cavities are defined between the upper die and the lower die of the vulcanizer, two rubber products are vulcanized at the same time.

According to the conventional rubber vulcanizing method, only two rubber products are molded during one vulcanization, and thus the productivity is low.

FIG. 7 illustrates a vulcanizer as a reference example, which is able to enhance the productivity. Note that, the vulcanizer as the reference example is disclosed by the inventors of the invention in order to facilitate the explanation of the invention, and is not known before the filing of the present application, that is, is not prior art, and thus it cannot be used to deny the patentability of the invention.

As illustrated in FIG. 7, the vulcanizer has an upper die 100 and a lower die 101. The upper die 100 and the lower die 101 have a plurality of recesses 103 and a plurality of recesses 104, respectively. The recesses 103 of the upper die 100 and the recesses 104 of the lower die 101 define a plurality of cavities 120 for forming rubber products in cooperation with each other.

As illustrated in FIG. 7, the cavities 120 are present on a plane orthogonal to a pressing direction indicated by an arrow B. The cavities 120 are located at intervals on a straight line. Because the vulcanizer has the multiple cavities 120, the number of rubber products manufactured per unit time is increased. Thus, the vulcanizer has an advantage that the productivity is high.

However, the vulcanizer, which is the reference example, has the multiple cavities 120 arranged in a direction orthogonal to the pressing direction. As a result, a large-sized pressing machine and the large-sized dies 100, 101 are indispensable. Thus, a great initial investment is required. Therefore, if production of the rubber products is discontinued, excessive losses are caused.

Further, with the vulcanizer, it is not easy to flexibly cope with variations in the number of rubber products to be manufactured, so that it is difficult to recoup an initial investment if the number of products to be manufactured varies. Thus, it is not easy to suppress manufacturing costs and to enhance the productivity.

SUMMARY OF THE INVENTION

One object of the invention is to provide a rubber vulcanizer and a rubber vulcanizing method, which make it possible to flexibly cope with variations in the number of rubber products to be manufactured, thereby suppressing manufacturing costs and achieving high productivity.

An aspect of the invention relates to a rubber vulcanizer including: a pair of heat plates disposed to be opposed to each other in a prescribed direction and to be apart from each other in the prescribed direction; and one or more dies for rubber molding stacked on each other in the prescribed direction between the heat plates. The rubber vulcanizer is able to realize either a state in which the dies of which the number is N are stacked on each other in the prescribed direction between the heat plates, or a state in which the dies of which the number is (N+1) are stacked on each other in the prescribed direction between the heat plates, where N is a natural number that satisfies at least a condition that $1 \leq N \leq M$, and M is a certain positive integer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, example embodiments of the invention will be described with reference to the accompanying drawings.

Figure 1:
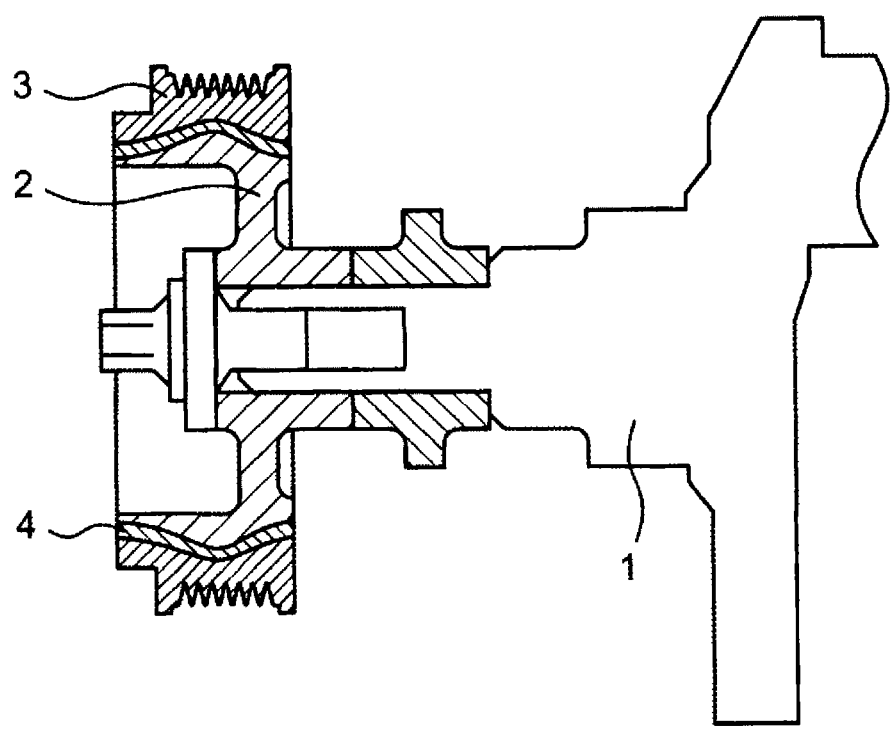
FIG. 1 is a schematic sectional view illustrating a damper pulley provided with a rubber damper that is manufactured by a rubber vulcanizer according to an embodiment of the invention.

FIG. 1 is a schematic sectional view illustrating a damper pulley provided with a rubber damper 4 that is manufactured by a rubber vulcanizer according to an embodiment of the invention.

The damper pulley is fitted on a crankshaft 1. The damper pulley includes an annular hub 2, an annular pulley mass 3 and the rubber damper 4. The rubber damper 4 is disposed between an outer peripheral face of the hub 2 and an inner peripheral face of the pulley mass 3. A rubber strip illustrated in FIG. 2, which is formed through vulcanization performed by the rubber vulcanizer, is rounded as illustrated in FIG. 3, and then press-fitted between the hub 2 and the pulley mass 3. In this way, the rubber damper 4 is formed.

Figure 2:
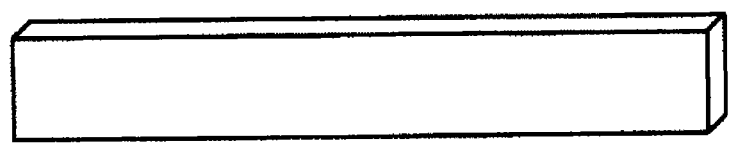
FIG. 2 is a view illustrating a rubber strip molded by the vulcanizer.
Figure 3:
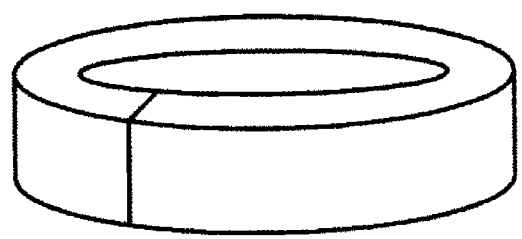
FIG. 3 is a view illustrating the rubber strip that has been rounded.
Figure 4:
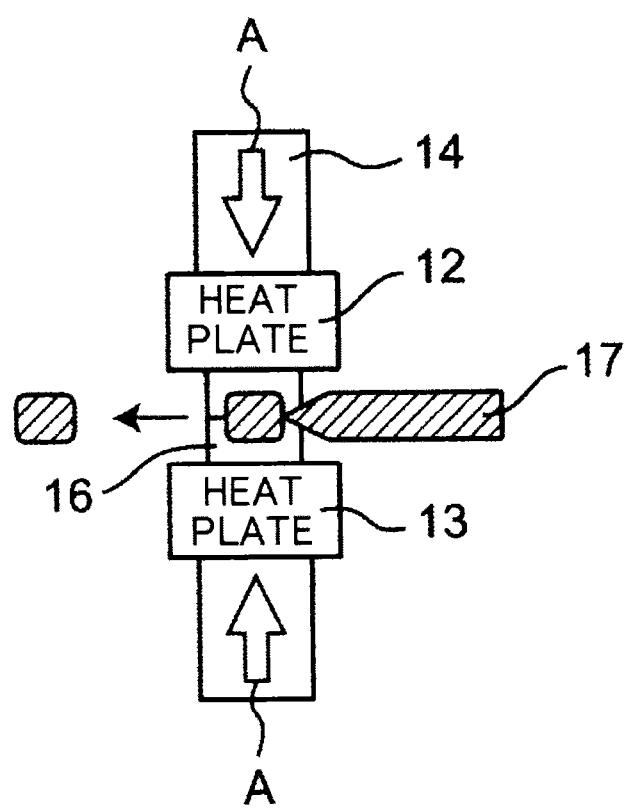
FIG. 4 is a schematic view illustrating the rubber vulcanizer in the embodiment of the invention, which is used to manufacture the rubber strip illustrated in FIG. 2.
Figure 5:
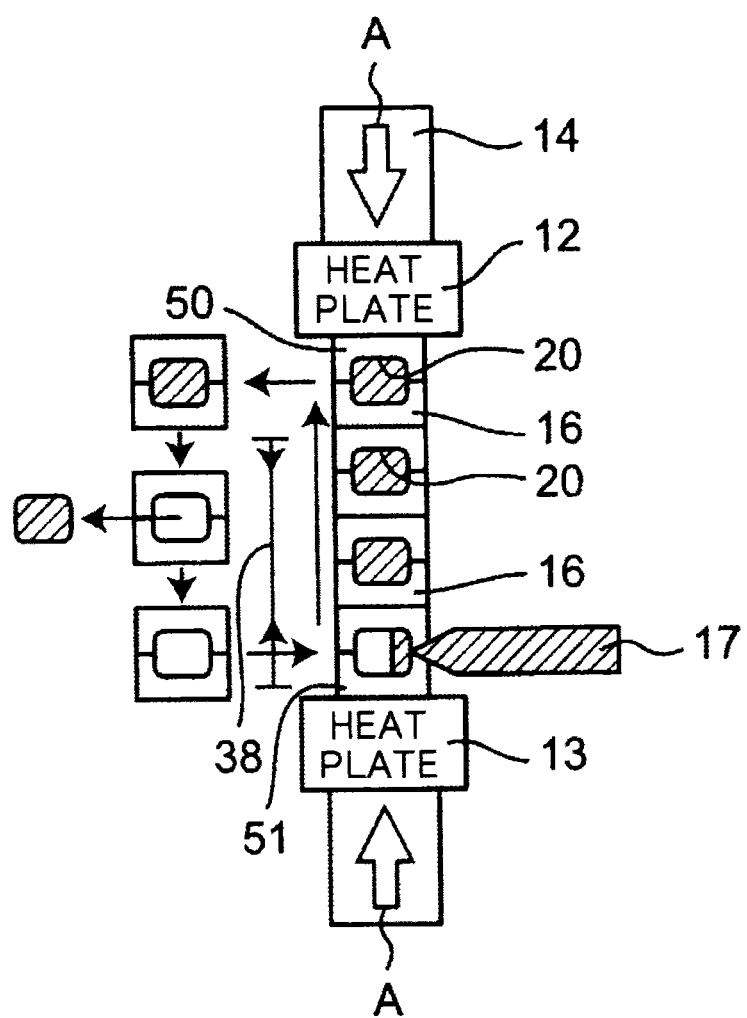
FIG. 5 is a schematic view illustrating the rubber vulcanizer in the embodiment of the invention, which is used to manufacture the rubber strip illustrated in FIG. 2.
Figure 6:
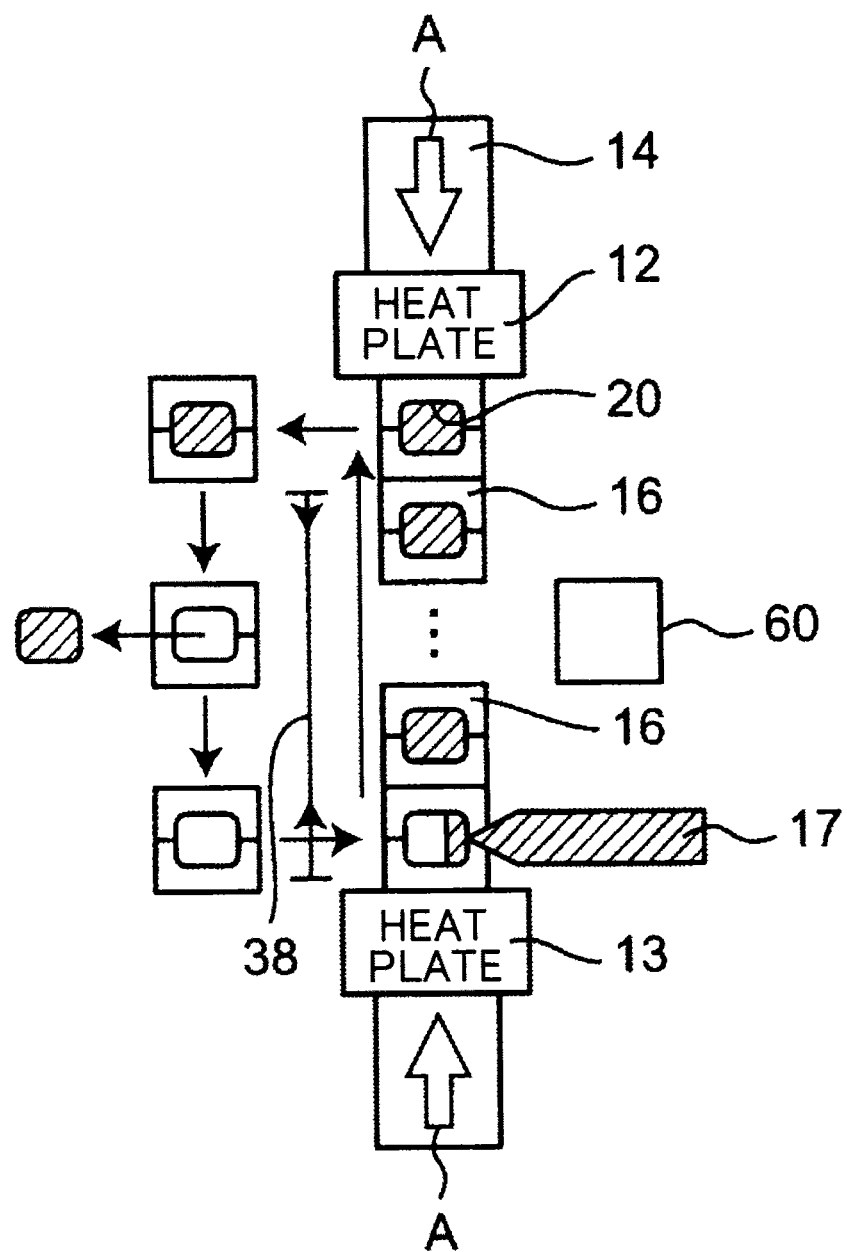
FIG. 6 is a schematic view illustrating the rubber vulcanizer in the embodiment of the invention, which is used to manufacture the rubber strip illustrated in FIG. 2.
Figure 7:
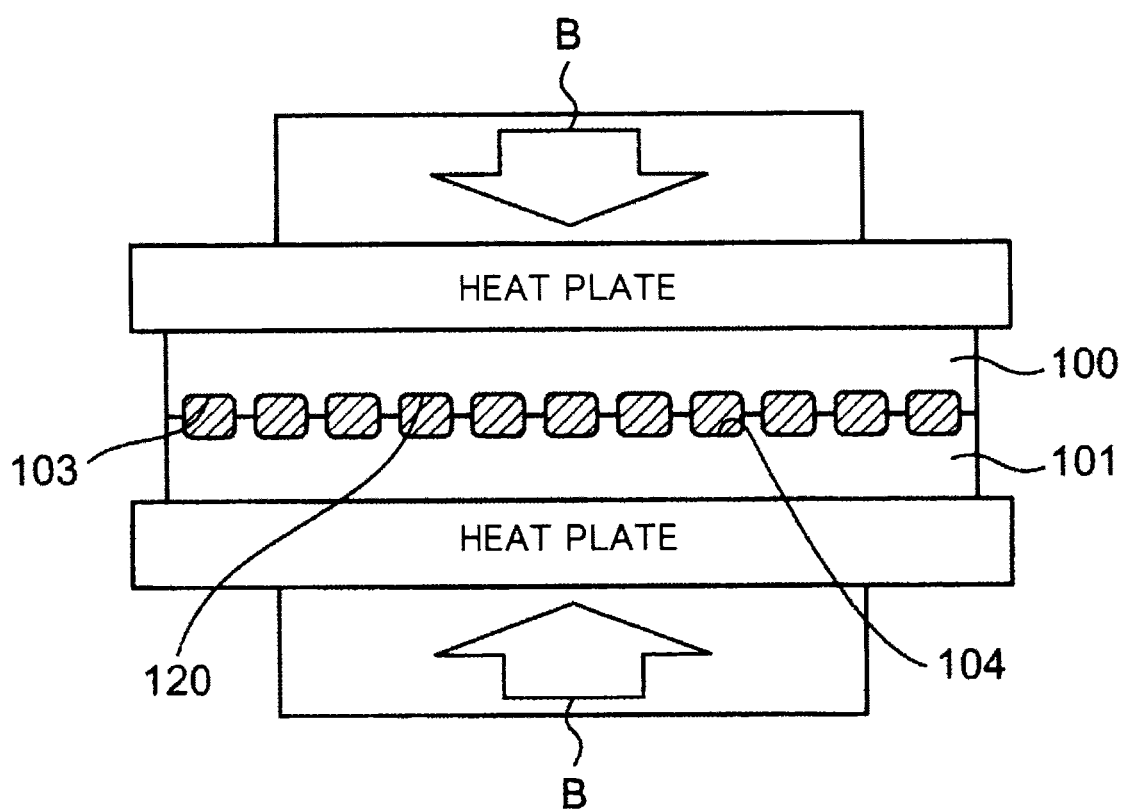
FIG. 7 is a schematic view illustrating a vulcanizer in a reference example.

FIG. 4, FIG. 5 and FIG. 6 are schematic views that illustrate the rubber vulcanizer in the embodiment of the invention, which is used to manufacture the rubber strip illustrated in FIG. 2.

As illustrated in FIG. 4, FIG. 5 and FIG. 6, the rubber vulcanizer includes a pair of heat plates 12, 13, a heat plate shifter 14, at least one die 16 for molding rubber, and an injection unit 17. The heat plates 12, 13 are a first heat plate 12 and a second heat plate 13. The first heat plate 12 and the second heat plate 13 are identical in plate shape and structure. The first heat plate 12 and the second heat plate 13 are opposed to each other in the direction of the normal to the second heat plate 13-side face of the first heat plate 12. This normal direction is coincident with the direction of the normal to the first heat plate 12-side face of the second heat plate 13. The direction of the normal to the second heat plate 13-side face of the first heat plate 12 will be referred to as "prescribed direction". The substantially entirety of the first heat plate 12 is overlapped with the substantially entirety of the second heat plate 13 as viewed from the prescribed direction. A heater is embedded in each of the heat plates 12, 13, and the heat plates 12, 13 radiate heat from the heaters.

The heat plate shifter 14 is a hydraulically-driven elevator or an electrically-driven elevator. The heat plate shifter 14 is able to move the heat plates 12, 13 in such a direction that the heat plates 12, 13 approach each other and in the prescribed direction. The heat plate shifter 14 is able to apply a desired pressure to an object held between the heat plates 12, 13. The heat plate shifter 14 is able to move the heat plates 12, 13 in the prescribed direction such that the heat plates 12, 13 move away from each other. The heat plate shifter 14 is able to flexibly change the distance between the heat plates 12, 13.

Specifically, in the present embodiment, the prescribed direction is coincident with the vertical direction, and the second heat plate 13 is stationary at a position below the first heat plate 12 in the vertical direction. The heat plate shifter 14 moves the first heat plate 12 up and down in the vertical direction. In this way, a pressure is applied to the die 16 as indicated by arrows A in FIG. 4, or the first heat plate 12 is separated from the second heat plate 13.

As illustrated in FIG. 5 and FIG. 6, the at least one die 16 has the identical shape. One face of each die 16 is rectangular, and each die 16 has a block structure. The multiple dies 16 can be stacked on each other in the prescribed direction. Each die 16 has only one cavity 20. The injection unit 17 includes a plunger with which rubber is charged in the cavity 20.

FIG. 4 is a schematic view illustrating the state where a small number of the rubber strips are manufactured by the rubber vulcanizer in the above-described embodiment.

When the number of the rubber strips to be manufactured is small, for example, only one die 16 is disposed between the heat plates 12, 13 as illustrated in FIG. 4. In this case, first, the distance between the heat plates 12, 13 is made longer than the length of the die 16 by the heat plate shifter 14. Then, the die 16 is disposed between the heat plates 12, 13. Subsequently, the heat plate shifter 14 causes the first heat plate 12 to approach the second heat plate 13 in the prescribed direction to apply a desired pressure to the die 16.

Then, rubber is charged into the cavity 20 by the injection unit 17, and a pressure is continuously applied to the die 16 for a period required to vulcanize the rubber. The period from the time immediately after the rubber is charged into the cavity 20 to the time when the rubber strip is removed from the die 16, that is, the period during which the die 16 is held between the heat plates 12, 13 is set to be coincident with a vulcanizing time for the rubber as a commercial product.

Then, the heat plate shifter 14 moves the first heat plate 12 upward in the vertical direction to separate the first heat plate 12 from the second heat plate 13. Finally, the die 16 is taken out from the space between the heat plates 12, 13, and the rubber strip after vulcanization is removed from the die 16. Then, the die 16 from which the rubber strip is removed is displaced between the heat plates 12, 13 again. These steps constitute one cycle. Subsequently, with the repetition of this cycle, the rubber strips are mass-produced.

FIG. 5 is a schematic view illustrating the state where the number of the rubber strips to be manufactured is larger than that in the case illustrated in FIG. 4.

When the number of the rubber strips to be manufactured is larger than that in the case illustrated in FIG. 4, for example, as illustrated in FIG. 5, four dies 16 are stacked on each other in the prescribed direction between the heat plates 12, 13.

In this case, the rubber vulcanizer further includes a partially-pressurizing device 38 and three dies 16 in addition to the components required in the case illustrated in FIG. 4. Each die 16 includes an upper die 50 and a lower die 51. Each of the upper die 50 and the lower die 51 has plate-like protrusions having a normal line extending in the prescribed direction. The protrusions of each upper die 50 are a first protrusion and a second protrusion. The first protrusion extends in a direction perpendicular to the sheet on which FIG. 5 is drawn and toward a person who sees FIG. 5, from a front-side end face of the upper die 50 in the direction perpendicular to the sheet on which FIG. 5 is drawn. The second protrusion extends in a direction perpendicular to the sheet on which FIG. 5 is drawn and away from the person who sees FIG. 5, from a back-side end face of the upper die 50 in the direction perpendicular to the sheet on which FIG. 5 is drawn. Similarly, the protrusions of each lower die 51 are a first protrusion and a second protrusion. The first protrusion extends in a direction perpendicular to the sheet on which FIG. 5 is drawn and toward the person who sees FIG. 5, from a front-side end face of the lower die 51 in the direction perpendicular to the sheet on which FIG. 5 is drawn. The second protrusion extends in a direction perpendicular to the sheet on which FIG. 5 is drawn and away from the person who sees FIG. 5, from a back-side end face of the lower die 51 in the direction perpendicular to the sheet on which FIG. 5 is drawn.

The partially-pressurizing device 38 also has front-side portions extending in a direction perpendicular to the sheet on which FIG. 5 is drawn and toward the person who sees FIG. 5, and back-side portions extending in a direction perpendicular to the sheet on which FIG. 5 is drawn and away from the person who sees FIG. 5, so as to correspond to the configurations of the upper die 50 and the lower die 51. The partially-pressurizing device 38 applies pressures to the upper faces of the first and second protrusions of the upper die 50 of one die 16 and the lower faces of the first and second protrusions of the lower die 51 of another die 16, which is located below the one die 16 in the vertical direction with yet another die 16 interposed therebetween. That is, the partially-pressurizing device 38 applies a desired pressure to the three dies 16 that are stacked on each other. The partially-pressurizing device 38 is able to move the three dies 16 stacked on each other, collectively up and down in the vertical direction while applying the desired pressure to the three dies 16 stacked on each other.

In this case, for example, the following steps constitute one cycle. First, a desired pressure is applied, by the partially-pressurizing device 38, to the three dies 16 stacked on each other and including the die 16, which is closest to the second heat plate 13. Then, while the desired pressure is applied to the three dies 16, the first heat plate 12 is moved upward by the heat plate shifter 14. Next, the die 16, which is closest to the first heat plate 12, is taken out. Subsequently, the vulcanized rubber strip is removed from the die 16 that has been taken out.

At the moment at which the die 16 is taken out, the three dies 16 to which the desired pressure is applied by the partially-pressurizing device 38 are moved upward while application of the desired pressure is maintained, to bring the uppermost die 16 into contact with the first heat plate 12. Then, the die 16 of which the cavity 20 is empty is inserted between the heat plates 12, 13 so as to be brought into contact with the second heat plate 13.

Then, the first heat plate 12 is moved downward to apply a desired pressure to the four dies 16, and at the same time, the rubber is charged into the lowermost die 16. When the desired pressure has been applied to the four dies 16 by the heat plate shifter 14, application of the pressure to the three dies 16 by the partially-pressurizing device 38 is cancelled. Then, the partially-pressurizing device 38 is moved downward. Next, as stated above, the desired pressure is applied, by the partially-pressurizing device 38, to the three dies 16 stacked on each other and including the die 16 that is closest to the second heat plate 13. In this way, the one cycle is completed.

Thus, the partially-pressurizing device 38 pressurizes, in the prescribed direction, the dies 16 stacked on each other in the prescribed direction, the number of the dies 16 pressurized by the partially-pressurizing device 38 being smaller than the maximum number of the dies 16 that are stacked on each other in the prescribed direction during the rubber vulcanization. Because the period of the vulcanization of the rubber is uniform, the period during which each of the dies 16 is held between the heat plates 12, 13 needs to be the same. Therefore, if the number of the rubber strips to be manufactured increases and thus the number of the dies stacked on each other increases, the injection cycle is shortened. Further. If the number of the dies 16 stacked on each other increases, the feeding speed for the dies 16 is increased.

In the present embodiment, because the dies 16 in the form of cells are arranged in series in the prescribed direction, the same pressure is applied to the heat plates 12, 13 by the heat plate shifter 14 irrespective of the number of the dies 16 stacked on each other. Thus, even if the number of the rubber strips to be manufactured is increased, the rubber strips can be vulcanized by a compact pressing machine.

FIG. 6 is a schematic view illustrating the state where the number of the rubber strips to be manufactured is larger than that in the case illustrated in FIG. 5.

When the number of the rubber strips to be manufactured is larger than that in the case illustrated in FIG. 5, for example, N (N is a natural number equal to or larger than five) dies 16 are stacked on each other in the prescribed direction between the heat plates 12, 13, as illustrated in FIG. 6. In this case, the steps in one cycle are the same as those in the case illustrated in FIG. 5. In this case, the partially-pressurizing device 38 applies a desired pressure to (N−1) dies 16 stacked on each other.

If the number of the dies 16 stacked on each other increases, the temperature near the middle position between the first heat plate 12 and the second heat plate 13 falls below the lower limit of a desired temperature range. In this case, as illustrated in FIG. 6, a heat source 60 such as a heater may be disposed near the middle position. In this way, the temperature of each of the dies 16 is reliably maintained within the desired temperature range as long as the dies 16 are disposed between the heat plates 12, 13.

It is needless to say that, when at least three dies 16 are stacked on each other during vulcanization of the rubber, the heat source 60 needs to be disposed so as to heat at least one of the dies 16 included in the at least three dies 16 and other than the uppermost and lowermost dies 16 in the prescribed direction. As illustrated in FIG. 4 to FIG. 6, the rubber vulcanizer is able to realize either the state in which N (a natural number) dies 16 are stacked on each other in the prescribed direction between the heat plates 12, 13, or the state in which (N+1) dies 16 are stacked on each other in the prescribed direction between the heat plates 12, 13, where N is a natural number that satisfies at least the condition that $1 \leq N \leq M$, and M is a certain positive integer.

According to the above-described embodiment, the dies 16 in the form of cells for molding the rubber strips are stacked on each other in one row and in series in the direction in which the heat plates 12, 13 are opposed to each other. Thus, it is possible to cope with variations in the number of rubber strips to be manufactured, by just adjusting the number of the dies 16 stacked on each other. As a result, it becomes considerably easier to flexibly cope with variations in the number of rubber strips to be manufactured, and suppress manufacturing costs, thereby enhancing the productivity.

With the conventional configuration in which the multiple cavities are arranged on a plane orthogonal to the direction in which the heat plates are opposed to each other, for example, even when only one rubber strip is molded, the entirety of the die having a large capacity needs to be heated. Thus, it is not possible to suppress the manufacturing costs.

According to the above-described embodiment, the dies 16 in the form of cells for molding the rubber strips are stacked on each other in one row and in series in the direction in which the heat plates 12, 13 are opposed to each other. Thus, it is no longer necessary to change the pressure even if the number of the dies 16 stacked on each other varies. Thus, the compact rubber vulcanizer is obtained.

Thus, according to the above-described embodiment, with compact equipment, it is possible to efficiently perform rubber vulcanization regardless of whether the number of rubber strips to be manufactured is small or large.

According to the above-described embodiment, there is provided the partially-pressurizing device 38 that is able to pressurize, in the prescribed direction, the dies 16 that are stacked on each other and of which the number is smaller than the maximum number of the dies 16 that can be stacked on each other. Thus, when the time required for vulcanization has elapsed and the die 16 that needs to be taken out from the stack is taken out, it is possible to apply a pressure to the dies 16 other than the die 16 that is taken out. Further, when another die 16 is newly stacked, it is possible to apply a pressure to the dies 16 other than the newly stacked die 16. Thus, it is possible to stack the dies 16 with time difference, and it is therefore possible to remove the rubber strip from the die 16 taken out from the stack after a lapse of the period required for the vulcanization, and to newly stack the die 16, from which the rubber strip is removed, in the prescribed direction. Thus, it is possible to form a production cycle with a finite number of the dies 16. As a result, it is possible to continuously produce the rubber strips, thereby considerably enhancing the mass-productivity.

According to the above-described embodiment, the provision of the heat source 60 restricts a decrease in the temperature of at least one of the dies 16 that are apart from the heat plates 12, 13. Thus, especially when the number of the dies 16 stacked on each other is large, the temperature variations due to the position in the stack are restricted. Thus, it is possible to manufacture the rubber strips with high quality.

In the above-described embodiment, each die 16 has only one cavity 20. However, in the invention, each die 16 may have a plurality of cavities.

In the above-described embodiment, the dies 16 that belong to the rubber vulcanizer are all identical to each other. However, in the invention, at least two dies 16 among all the dies 16 that belong to the rubber vulcanizer may be different from the other dies 16.

In the above-described embodiment, the heat plate shifter 14 keeps the second heat plate 13 stationary but moves the first heat plate 12 up and down in the vertical direction, thereby pressurizing at least one die 16. However, in the invention, the heat plate shifter may be configured to move only the second heat plate 13 up and down in the vertical direction, or configured to move both the first heat plate 12 and the second heat plate 13 in the vertical direction. In the invention, the heat plate shifter may have any configuration as long as the relative distance between the first heat plate 12 and the second heat plate 13 is variable.

In the above-described embodiment, the prescribed direction in which the heat plates 12, 13 are opposed to each other is the vertical direction. However, in the invention, the prescribed direction in which the heat plates 12, 13 are opposed to each other may be any directions other than the vertical direction, and may be for example, the horizontal direction.

In the above-described embodiment, the dies 16 located near the middle position between the heat plates 12, 13 are heated by the heat source 60 such as a heater. However, the heat source 60 need not be provided in the invention.

In the above-described embodiment, each die 16 incorporates no heat source such as a heater. However, in the invention, each die 16 preferably incorporates a heat source such as a heater. This is because the dies 16 that are apart from both the heat plates 12, 13 are heated by the heat sources incorporated in the dies 16, so that the temperature of each die 16 is maintained within a desired temperature range.

According to the invention, it is possible to provide the rubber vulcanizer and the rubber vulcanizing method, which make it possible to flexibly cope with variations in the number of rubber products to be manufactured, thereby suppressing manufacturing costs and achieving high productivity.

What is claimed is:

1. A rubber vulcanizer comprising:
 a pair of heat plates disposed to be opposed to each other in a prescribed direction and to be separated from each other in the prescribed direction;
 one or more dies for rubber molding stacked on each other in the prescribed direction between the heat plates to be pressurized by the opposed heat plates, wherein the rubber vulcanizer is able to realize either a state in which the dies of which the number is N are stacked on each other in the prescribed direction between the heat plates, or a state in which the dies of which the number is (N+1) are stacked on each other in the prescribed direction between the heat plates, where N is a natural number that satisfies at least a condition that $1 \leq N \leq M$, and M is a certain positive integer; and
 a partially-pressurizing device that is able to selectively pressurize, in the prescribed direction and independent of the pressurization by the opposed heat plates, a number of the dies that are stacked on each other in the prescribed direction, which number is smaller than a maximum number of the dies that are stacked on each other in the prescribed direction during rubber vulcanization.

2. The rubber vulcanizer according to claim 1, wherein:
 the number of the dies is at least three;
 the at least three dies are stacked on each other in the prescribed direction during rubber vulcanization; and
 the rubber vulcanizer further comprises a heating device that heats at least one of the at least three dies other than the outermost dies in the prescribed direction.

3. A rubber vulcanizing method comprising:
 stacking multiple dies for rubber molding on each other in a prescribed direction between a pair of heat sources disposed to be opposed to each other in the prescribed direction to pressurize the stacked multiple dies, and to be spaced from each other in the prescribed direction;
 heating the multiple dies stacked on each other with use of the heat sources; and
 using a partially-pressurizing device that is able to selectively pressurize, in the prescribed direction and independent of the pressurization by the opposed heat sources, a number of the dies that are stacked on each other in the prescribed direction, which number is smaller than a maximum number of the dies that are stacked on each other in the prescribed direction during the heating step, to change the number of multiple dies stacked on each other during the heating step.

* * * * *